(12) United States Patent
Hamasaki

(10) Patent No.: US 6,827,190 B2
(45) Date of Patent: Dec. 7, 2004

(54) ONE-WAY ROTATIONAL TRANSFER MECHANISM

(75) Inventor: Takuji Hamasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/457,483

(22) Filed: Jun. 10, 2003

(65) Prior Publication Data
US 2003/0230459 A1 Dec. 18, 2003

(30) Foreign Application Priority Data

Jun. 12, 2002 (JP) ........................................ 2002-171070

(51) Int. Cl.[7] ............................................. F16D 41/066
(52) U.S. Cl. ........................................... 192/38; 192/45
(58) Field of Search ............................. 192/38, 31, 45, 192/219.3, 223.2

(56) References Cited

U.S. PATENT DOCUMENTS

| | | | | |
|---|---|---|---|---|
| 3,584,713 A | * | 6/1971 | Tani et al. ..................... | 192/38 |
| 3,937,311 A | * | 2/1976 | Gehrke ......................... | 192/45 |
| 4,346,857 A | * | 8/1982 | Moll ............................. | 192/45 |
| 5,743,350 A | * | 4/1998 | Yamawaki et al. ........... | 192/38 |
| 5,915,514 A | * | 6/1999 | Nojiri et al. .................. | 192/38 |

* cited by examiner

Primary Examiner—Rodney H. Bonck
(74) Attorney, Agent, or Firm—Greenblum & Bernstein, P.L.C.

(57) ABSTRACT

A one-way rotational transfer mechanism includes a rotary input shaft having a surface lying orthogonal to an axis of the rotary input shaft, a hollow-cylindrical rotary output shaft positioned around the rotary input shaft to be rotatable relative to the rotary input shaft, a circumferentially-uneven-width-space forming portion formed on the rotary input shaft to be adjacent to the orthogonal surface to form at least one accommodation space between the rotary input shaft and the cylindrical inner peripheral surface, at least one rotatable member installed in the accommodation space, and a biasing device for pressing the orthogonal surface and the rotatable member toward each other. The circumferentially-uneven-width-space forming portion is shaped so that rotation of the rotary input shaft is transferred to the hollow-cylindrical rotary output shaft via the rotatable member to which rotation is given from the orthogonal surface.

60 Claims, 8 Drawing Sheets

ONE-WAY ROTATIONAL TRANSFER MECHANISM

BACKGROUND OF THE INVENTION

1. Field of the Invention

The present invention relates to a one-way rotational transfer mechanism having a rotary input shaft and a rotary output shaft which are coaxially arranged, wherein rotation of the rotary input shaft is transferred to the rotary output shaft when the rotary input shaft is rotated by, e.g., motor, but rotation of the rotary output shaft is not transferred to the rotary input shaft when rotary output shaft is rotated.

2. Description of the Related Art

Among conventional mechanisms having a rotary input shaft and a rotary output shaft, wherein rotation of the rotary input shaft is transferred to the rotary output shaft when the rotary input shaft is rotated by a motor, a mechanism which prevents the motor from being rotated by rotation of the rotary output shaft when the rotary output shaft is rotated is not known in the art. Note that the term "one-way rotational transfer" used in the present specification and claims means to allow rotation of the rotary input shaft to be transferred to the rotary output shaft while preventing rotation of the rotary output shaft to be transferred to the rotary input shaft.

SUMMARY OF THE INVENTION

The present invention provides a simple one-way rotational transfer mechanism which allows rotation of the rotary input shaft to be transferred to the rotary output shaft while preventing rotation of the rotary output shaft from being transferred to the rotary input shaft.

According to an aspect of the present invention, a one-way rotational transfer mechanism is provided, including a rotary input shaft having an orthogonal surface lying in a plane orthogonal to an axis of the rotary input shaft, a hollow-cylindrical rotary output shaft positioned around the rotary input shaft to be freely rotatable relative to the rotary input shaft about the axis thereof, the hollow-cylindrical rotary output shaft having a cylindrical inner peripheral surface about the axis of the rotary input shaft, a circumferentially-uneven-width-space forming portion formed on the rotary input shaft to be adjacent to the orthogonal surface to form at least one accommodation space between the rotary input shaft and the cylindrical inner peripheral surface, at least one rotatable member installed in the accommodation space, and a biasing device for making the orthogonal surface and the rotatable member come into pressing contact with each other. The circumferentially-uneven-width-space forming portion is shaped so that a rotation of the rotary input shaft is transferred to the hollow-cylindrical rotary output shaft via the rotatable member to which the rotation is given from the orthogonal surface when the rotary input shaft is driven to rotate.

It is desirable for the rotatable member to be a ball.

The rotatable member can include a ball, and a ring in which the ball is loosely fitted. The ring is positioned in associated the accommodation space so that an axis of the ring extends substantially parallel to each of the axis of the rotary input shaft and an axis of the hollow-cylindrical rotary output shaft.

It is desirable for an axial length of the ring to be smaller than a diameter of the ball.

The rotatable member can include a cylindrical column roller which is positioned in associated the accommodation space so that an axis of the cylindrical column roller extends substantially in a radial direction of the rotary input shaft.

The rotary input shaft can include an outer flange on which the orthogonal surface is formed.

The circumferentially-uneven-width-space forming portion can be a portion having a non-circular cross section which includes at least one surface orthogonal to a radial direction of the rotary input shaft.

It is desirable for the circumferentially-uneven-width-space forming portion having the non-circular cross section to be in the shape of a polygon.

It is desirable for the circumferentially-uneven-width-space forming portion to include at least one pair of inclined surfaces which are symmetrical with respect to a line extending in a radial direction of the rotary input shaft.

The circumferentially-uneven-width-space forming portion can be an eccentric cylindrical surface which is eccentric from the axis of the rotary input shaft.

The one-way rotational transfer mechanism can include two parallel bearing plates, each having a boss, the rotary input shaft being fitted in respective central holes of the bosses so that the rotary input shaft is freely rotatable about an axis of the bosses.

The hollow-cylindrical rotary output shaft can be fitted on outer peripheral surfaces of the bosses to be freely rotatable about the axis of the rotary input shaft.

The circumferentially-uneven-width-space forming portion is positioned between the orthogonal surface and an end surface of one of the bosses, the end surface lying in a plane orthogonal to the axis of the rotary input shaft.

The biasing device can be a compression coil spring.

The one-way rotational transfer mechanism can include two parallel bearing plates, each having a boss, the rotary input shaft being fitted in respective central holes of the bosses so that the rotary input shaft is freely rotatable about an axis of the bosses. The biasing device can be a compression coil spring which is positioned between the outer flange and one of the bosses, and the circumferentially-uneven-width-space forming portion can be positioned between the orthogonal surface of the outer flange and an end surface of the other of the bosses, the end surface lying in a plane orthogonal to the axis of the rotary input shaft.

In another embodiment, a one-way rotational transfer mechanism is provided, including a rotary input shaft having a first orthogonal surface lying in a plane orthogonal to an axis of the rotary input shaft; a hollow-cylindrical rotary output shaft positioned around the rotary input shaft to be freely rotatable relative to the rotary input shaft about the axis thereof, the hollow-cylindrical rotary output shaft having a cylindrical inner peripheral surface about the axis of the rotary input shaft; a second orthogonal surface formed on a boss and lying in a plane orthogonal to the axis of the rotary input shaft to face the first orthogonal surface; a circumferentially-uneven-width-space forming portion formed on the rotary input shaft between the first orthogonal surface and the second orthogonal surface to form at least one accommodation space between the rotary input shaft and the cylindrical inner peripheral surface; at least one rotatable member installed in the accommodation space; and a biasing device which biases one of the rotary input shaft and the hollow-cylindrical rotary output shaft in a direction along the axis of the rotary input shaft to reduce a space between the first orthogonal surface and the second orthogonal surface so that the rotatable member is held tight between the first orthogonal surface and the second orthogonal surface. The circumferentially-uneven-width-space forming portion is shaped so that a rotation of the rotary input shaft is transferred to the hollow-cylindrical rotary output shaft via the rotatable member to which the rotation is given from the first orthogonal surface when the rotary input shaft is driven to rotate.

It is desirable for the rotatable member to be a ball.

The rotatable member can include a ball, and a ring in which the ball is loosely fitted. The ring is positioned in associated the accommodation space so that an axis of the ring extends substantially parallel to each of the axis of the rotary input shaft and an axis of the hollow-cylindrical rotary output shaft.

It is desirable for an axial length of the ring is smaller than a diameter of the ball.

The rotatable member can include a cylindrical column roller which is positioned in associated the accommodation space so that an axis of the cylindrical column roller extends substantially in a radial direction of the rotary input shaft.

The rotary input shaft can include an outer flange on which the orthogonal surface is formed.

The circumferentially-uneven-width-space forming portion can be a portion having a non-circular cross section which includes at least one surface orthogonal to a radial direction of the rotary input shaft.

It is desirable for the circumferentially-uneven-width-space forming portion having the non-circular cross section is in the shape of a polygon.

It is desirable for the circumferentially-uneven-width-space forming portion to include at least one pair of inclined surfaces which are symmetrical with respect to a line extending in a radial direction of the rotary input shaft.

The circumferentially-uneven-width-space forming portion can be an eccentric cylindrical surface which is eccentric from the axis of the rotary input shaft.

The one-way rotational transfer mechanism can include two parallel bearing plates, each having a boss, the rotary input shaft being fitted in respective central holes of the bosses so that the rotary input shaft is freely rotatable about an axis of the bosses.

The hollow-cylindrical rotary output shaft can be fitted on outer peripheral surfaces of the bosses to be freely rotatable about the axis of the rotary input shaft.

The circumferentially-uneven-width-space forming portion is positioned between the orthogonal surface and an end surface of one of the bosses, the end surface lying in a plane orthogonal to the axis of the rotary input shaft.

The biasing device can be a compression coil spring.

The one-way rotational transfer mechanism can include two parallel bearing plates, each having a boss, the rotary input shaft being fitted in respective central holes of the bosses so that the rotary input shaft is freely rotatable about an axis of the bosses. The biasing device includes a compression coil spring which is positioned between the outer flange and one of the bosses, and the circumferentially-uneven-width-space forming portion is positioned between the orthogonal surface of the outer flange and an end surface of the other of the bosses, the end surface lying in a plane orthogonal to the axis of the rotary input shaft.

In another embodiment, a one-way rotational transfer mechanism is provided, including a rotary output shaft, a hollow-cylindrical rotary input shaft positioned around the rotary output shaft to be freely rotatable relative to the rotary output shaft about an axis thereof, the hollow-cylindrical rotary input shaft having an orthogonal surface lying in a plane orthogonal to an axis of the hollow-cylindrical rotary input shaft, a circumferentially-uneven-width-space forming portion formed on the hollow-cylindrical rotary input shaft to be adjacent to the orthogonal surface to form at least one accommodation space between the rotary output shaft and an inner peripheral surface of the hollow-cylindrical rotary input shaft, at least one rotatable member installed in the accommodation space, and a biasing device for making the orthogonal surface and the rotatable member come into pressing contact with each other. The circumferentially-uneven-width-space forming portion is shaped so that a rotation of the hollow-cylindrical rotary input shaft is transferred to the rotary output shaft via the rotatable member to which the rotation is given from the orthogonal surface when the hollow-cylindrical rotary input shaft is driven to rotate.

It is desirable for the rotatable member to be a ball.

The rotatable member can include a ball, and a ring in which the ball is loosely fitted. The ring is positioned in associated the accommodation space so that an axis of the ring extends substantially parallel to each of the axis of the hollow-cylindrical rotary input shaft and an axis of the rotary output shaft.

It is desirable for an axial length of the ring to be smaller than a diameter of the ball.

The rotatable member can include a cylindrical column roller which is positioned in associated the accommodation space so that an axis of the cylindrical column roller extends substantially in a radial direction of the rotary output shaft.

The hollow-cylindrical rotary input shaft can include an inner flange on which the orthogonal surface is formed.

The circumferentially-uneven-width-space forming portion can include a portion having a non-circular cross section which includes at least one surface orthogonal to a radial direction of the rotary output shaft.

The portion having the non-circular cross section can be in the shape of a polygon.

It is desirable for the circumferentially-uneven-width-space forming portion to include at least one pair of inclined surfaces symmetrical with respect to a line extending in a radial direction of the rotary output shaft.

The circumferentially-uneven-width-space forming portion can be an eccentric cylindrical surface which is eccentric from the axis of the rotary output shaft.

The one-way rotational transfer mechanism can include two parallel bearing plates, each having a boss, the rotary output shaft being fitted in respective central holes of the bosses so that the rotary output shaft is freely rotatable about an axis of the two bosses.

The hollow-cylindrical rotary input shaft can be fitted on outer peripheral surfaces of the bosses to be freely rotatable about the axis of the rotary output shaft.

The circumferentially-uneven-width-space forming portion is positioned between the orthogonal surface and an end surface of one of the bosses, the end surface lying in a plane orthogonal to the axis of the rotary output shaft.

The biasing device can be a compression coil spring.

The one-way rotational transfer mechanism can include two parallel bearing plates, each having a boss, the rotary output shaft being fitted in respective central holes of the bosses so that the rotary output shaft is freely rotatable about an axis of the bosses. The biasing device includes a compression coil spring which is positioned between the inner flange and one of the bosses, and the circumferentiallyuneven-width-space forming portion is positioned between the orthogonal surface of the inner flange and an end surface of the other of the bosses, the end surface lying in a plane orthogonal to the axis of the rotary output shaft.

In another embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having an orthogonal surface lying in a plane orthogonal to an axis of the hollow-cylindrical rotary input shaft; a second orthogonal surface formed on a boss to lie in a plane orthogonal to the axis of the rotary output shaft and to face the first orthogonal surface; a circumferentially-uneven-width-space forming portion formed on the hollow-cylindrical rotary input shaft between the first orthogonal surface and the second orthogonal surface to form at least one accommodation space between the rotary output shaft and an inner peripheral surface of the hollow-cylindrical rotary input shaft; at least one rotatable member installed in the at least one accommodation space; and a biasing device which biases one of the rotary output shaft and the hollow-cylindrical rotary input shaft in a direction along the axis of the rotary output shaft to reduce a space between the first orthogonal surface and the second orthogonal surface so that the rotatable member are held tight between the first orthogonal surface and the second orthogonal surface. The circumferentially-uneven-width-space forming portion is shaped so that a rotation of the hollow-cylindrical rotary input shaft is transferred to the rotary output shaft via the rotatable member to which the rotation is given from the first orthogonal surface when the hollow-cylindrical rotary input shaft is driven to rotate.

It is desirable for the rotatable member to include a ball.

The rotatable member can include a ball, and a ring in which the ball is loosely fitted. The ring is positioned in associated the accommodation space so that an axis of the ring extends substantially parallel to each of the axis of the hollow-cylindrical rotary input shaft and an axis of the rotary output shaft.

It is desirable for an axial length of the ring to be smaller than a diameter of the ball.

The rotatable member can include a cylindrical column roller which is positioned in associated the accommodation space so that an axis of the cylindrical column roller extends substantially in a radial direction of the rotary output shaft.

The hollow-cylindrical rotary input shaft can include an inner flange on which the orthogonal surface is formed.

The circumferentially-uneven-width-space forming portion can be a portion having a non-circular cross section which includes at least one surface orthogonal to a radial direction of the rotary output shaft.

It is desirable for the portion having the non-circular cross section to be in the shape of a polygon.

It is desirable for the circumferentially-uneven-width-space forming portion to include at least one pair of inclined surfaces symmetrical with respect to a line extending in a radial direction of the rotary output shaft.

The circumferentially-uneven-width-space forming portion can be an eccentric cylindrical surface which is eccentric from the axis of the rotary output shaft.

The one-way rotational transfer mechanism can include two parallel bearing plates, each having a boss, the rotary output shaft being fitted in respective central holes of the bosses so that the rotary output shaft is freely rotatable about an axis of the two bosses.

The hollow-cylindrical rotary input shaft is fitted on outer peripheral surfaces of the bosses to be freely rotatable about the axis of the rotary output shaft.

The circumferentially-uneven-width-space forming portion is positioned between the orthogonal surface and an end surface of one of the bosses, the end surface lying in a plane orthogonal to the axis of the rotary output shaft.

The biasing device can be a compression coil spring.

The one-way rotational transfer mechanism can include two parallel bearing plates, each having a boss, the rotary output shaft being fitted in respective central holes of the bosses so that the rotary output shaft is freely rotatable about an axis of the bosses. The biasing device includes a compression coil spring which is positioned between the inner flange and one of the bosses, and the circumferentially-uneven-width-space forming portion is positioned between the orthogonal surface of the inner flange and an end surface of the other of the bosses, the end surface lying in a plane orthogonal to the axis of the rotary output shaft.

The present disclosure relates to subject matter contained in Japanese Patent Application No.2002-171070 (filed on Jun. 12, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
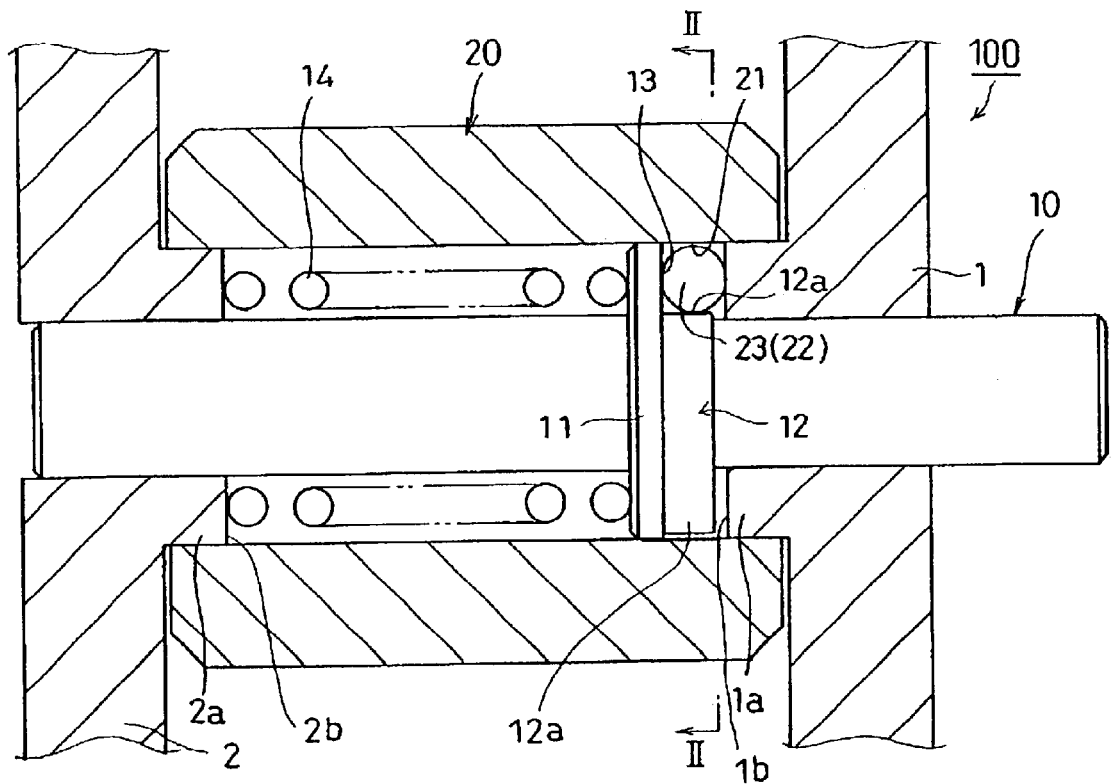
FIG. 1 is a longitudinal cross sectional view of a first embodiment of a one-way rotational transfer mechanism according to the present invention.
Figure 2:
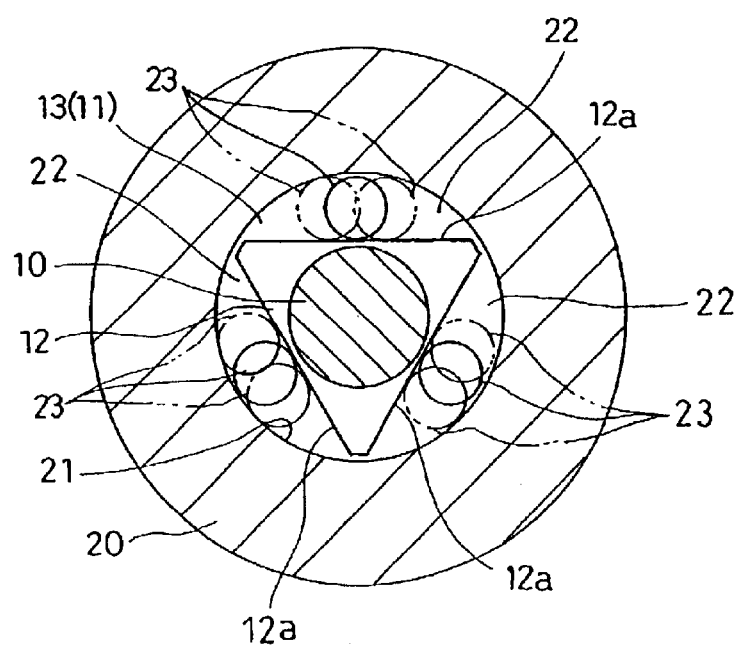
FIG. 2 is a cross sectional view taken along II—II line shown in FIG. 1, showing an embodiment of a fundamental portion of the one-way rotational transfer mechanism shown in FIG. 1.
Figure 3:
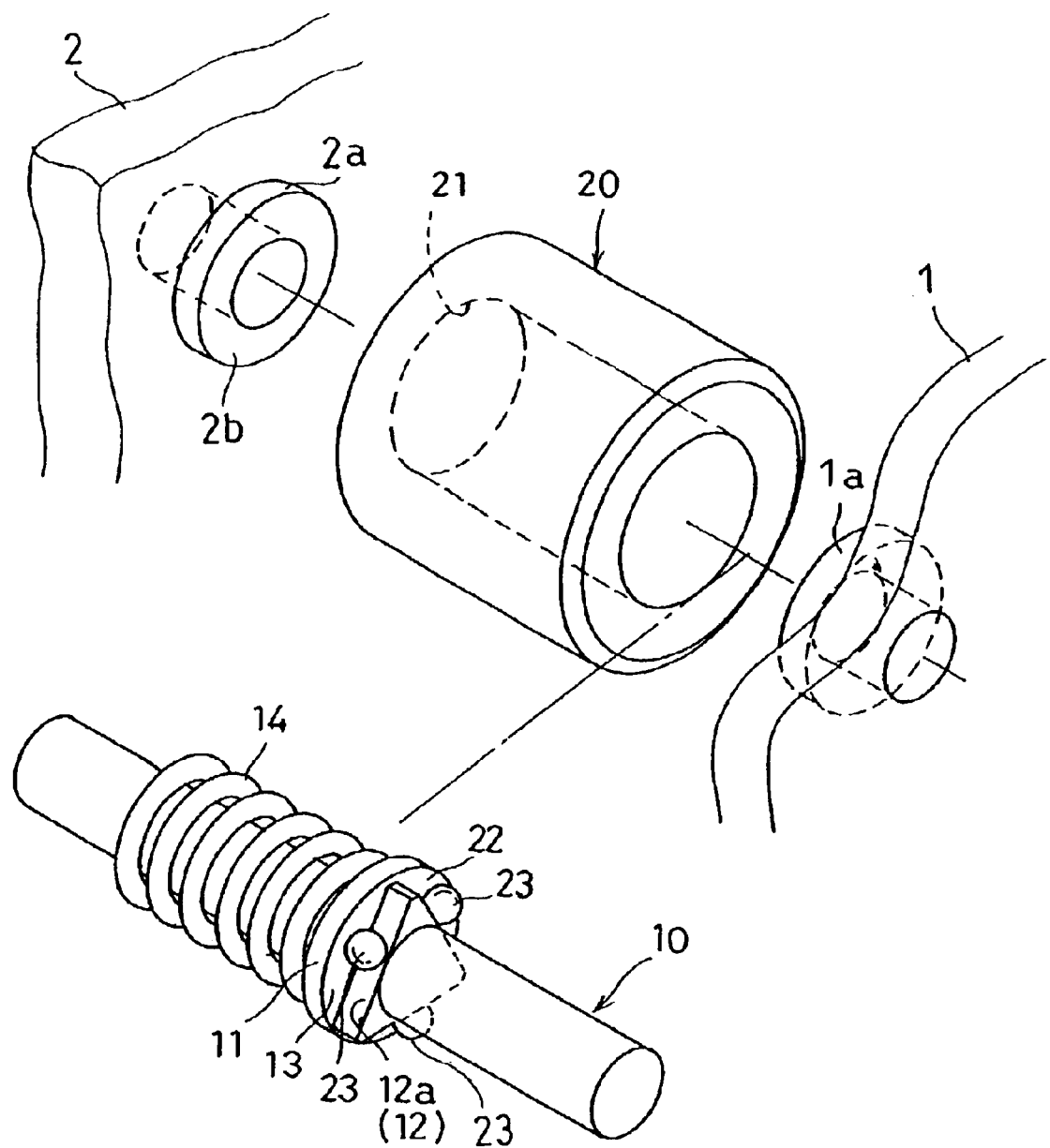
FIG. 3 is an exploded perspective view, partly cutaway, of the one-way rotational transfer mechanism shown in FIG. 1.

FIGS. 1 through 3 show the first embodiment of the one-way rotational transfer mechanism according to the present invention. The one-way rotational transfer mechanism 100 is provided with two parallel bearing plates: a first bearing plate 1 and a second bearing plate 2 which have bosses 1a and 2a, respectively. Central holes of the bosses 1a and 2a are aligned on a common axis. The one-way rotational transfer mechanism 100 is provided with a rotary input shaft 10 which is fitted in the central holes of the bosses 1a and 2a so that the rotary input shaft 10 is freely rotatable about an axis of the bosses 1a and 2a. The rotary input shaft 10 is driven by, e.g., motor (not shown). The rotary input shaft 10 is provided between the opposite ends thereof, between the bosses 1a and 2a, with an outer flange 11. The rotary input shaft 10 is provided, adjacent to the outer flange 11 between the outer flange 11 and the boss 1a, with a triangular prism portion 12, the axial center of which is coaxial to the axis of the rotary input shaft 10. The triangular prism portion 12 has an even thickness in the axial direction (horizontal direction as viewed in FIG. 1) of the rotary input shaft 10. The triangular prism portion 12 serves as a circumferentially-uneven-width-space forming portion (a portion having a non-circular cross section). The triangular prism portion 12 has a substantially regular triangular shape as viewed from one end of the rotary input shaft 10 along the axis thereof. The outer peripheral surface of the triangular prism portion 12 is provided with three contact surfaces 12a arranged at regular intervals of 120 degrees about the axis of the rotary input shaft 10. Each contact surface 12a is a flat surface, and extends orthogonal to a radial direction of the rotary input shaft 10. The outer flange 11 is provided on one side (right side as viewed in FIG. 1) thereof adjacent to the triangular prism portion 12 with an orthogonal surface (first orthogonal surface) 13 which lies in a plane orthogonal to the axis of the rotary input shaft 10. The boss 1a is provided, on one end (left end as viewed in FIG. 1) thereof facing the orthogonal surface 13, with an orthogonal end surface 1b (second orthogonal surface) which lies in a plane orthogonal to the axis of the rotary input shaft 10. Namely, the orthogonal surface 13 and the orthogonal end surface 1b extend parallel to each other.

The one-way rotational transfer mechanism 100 is provided, on outer peripheral surfaces of the bosses 1a and 2a between the first and the second bearing plates 1 and 2, with a hollow-cylindrical rotary output shaft 20 which is freely rotatable about the axis of the rotary input shaft 10. The hollow-cylindrical rotary output shaft 20 has a simple hollow cylindrical shape, and has a cylindrical inner peripheral surface 21. A space between the orthogonal surface 13 of the outer flange 11 and the orthogonal end surface 1b of the boss 1a around the triangular prism portion 12 is surrounded by a portion of the inner peripheral surface 21 of the hollow-cylindrical rotary output shaft 20 to form three accommodation spaces 22 (see FIG. 2) each serving as a circumferentially-uneven-width-space. In the present embodiment shown in FIGS. 1 through 3, the number of accommodation spaces 22 formed by the circumferentially-uneven-width-space forming portion is three, and a steel ball 23 is installed in each of the three accommodation spaces 22 because the triangular prism portion 12 serves as the circumferentially-uneven-width-space forming portion. The steel balls 23 have a diameter smaller than the maximum width of each accommodation space 22 in a radial direction of the rotary input shaft 10 so that each steel ball 23 can move in the associated accommodation space 22. Each steel ball 23 is a precision engineered hard steel ball. Hardened steel balls of a conventional ball bearing can be used as the steel balls 23.

The one-way rotational transfer mechanism 100 is provided on the rotary input shaft 10 between the outer flange 11 and the boss 2a with a compression coil spring 14. The compression coil spring 14 biases the input rotary shaft 10 along the axis thereof in a direction to move the orthogonal surface 13 of the outer flange 11 toward the orthogonal end surface 1b of the boss 1a so that the three steel balls 23 are held tight between the orthogonal surface 13 and the orthogonal end surface 1b.

Operations of the one-way rotational transfer mechanism 100 having the above described structure will be discussed hereinafter.

An important point in the structure of the one-way rotational transfer mechanism 100 is that the orthogonal surface 13 of the outer flange 11 and each steel ball 23 are in intimate contact with each other by the spring force of the compression coil spring 14; namely, each steel ball 23 is always sandwiched between the orthogonal surface 13 and the orthogonal end surface 1b.

If the rotary input shaft 10 is driven to rotate, the outer flange 11 rotates together with the rotary input shaft 10, and this rotation of the outer flange 11 rotates each steel ball 23 that is in frictional contact with the orthogonal surface 13. Accordingly, each steel ball 23 moves from a neutral position thereof (indicated by a solid line in FIG. 2), in a rotational direction opposite to the rotational direction of the rotary input shaft 10 with respect to the orthogonal surface 13, to move into one of wedge-shaped opposite ends which are formed in the associated accommodation space 22 between the associated contact surface 12a of the triangular prism portion 12 and the inner peripheral surface 21 of the hollow-cylindrical rotary output shaft 20. As a result, each steel ball 23 comes into firm contact with the inner peripheral surface 21 to thereby transfer rotation of the rotary input shaft 10 to the hollow-cylindrical rotary output shaft 20 via the steel balls 23 and the inner peripheral surface 21 of the hollow-cylindrical rotary output shaft 20. This action occurs regardless of the rotational direction of the rotary input shaft 10. Namely, rotation of the rotary input shaft 10 in either rotational direction can be transferred to the hollow-cylindrical rotary output shaft 20.

On the other hand, if the hollow-cylindrical rotary output shaft 20 is driven to rotate, each steel ball 23 merely rotates in the associated accommodation space 22 because the steel ball 23 is merely in point contact with the inner peripheral surface 21 of the hollow-cylindrical rotary output shaft 20 even if the steel ball 23 is in contact with the inner peripheral surface 21. Therefore, no rotation of the hollow-cylindrical rotary output shaft 20 is transferred to the rotary input shaft 10 even if a rotation is given to the hollow-cylindrical rotary output shaft 20.

Namely, when the rotary input shaft 10 is driven to rotate, each steel ball 23 is engaged with one of the wedge-shaped opposite ends that are formed between the associated contact surface 12a and the inner peripheral surface 21 because the rotation of the rotary input shaft 10 is transferred to each steel ball 23 via the orthogonal surface 13; consequently, the rotation of the rotary input shaft 10 is transferred to the hollow-cylindrical rotary output shaft 20. However, when the hollow-cylindrical rotary output shaft 20 is driven to rotate, very little force or substantially no force is generated, i.e., sufficient force for causing each steel ball 23 to engage with one of the wedge-shaped opposite ends is not generated because the rotation of the hollow-cylindrical rotary output shaft 20 is transferred to each steel ball 23 via the inner peripheral surface 21. As a consequence, the rotation of the hollow-cylindrical rotary output shaft 20 is not transferred to the rotary input shaft 10.

In the one-way rotational transfer mechanism 100 having the above described structure, if the hollow-cylindrical rotary output shaft 20 is firmly held to be fixed forcibly relative to the first and second bearing plates 1 and 2, each steel ball 23 merely rotates in the associated accommodation space 22 while sliding on the orthogonal surface 13 and the orthogonal end surface 1b even when the rotary input shaft 10 is driven to rotate, unless either the triangular prism portion 12 or the hollow-cylindrical rotary output shaft 20 is broken. This means that the one-way rotational transfer mechanism 100 can also serve as an output torque limiter. Torque which can be transferred from the rotary input shaft 10 to the hollow-cylindrical rotary output shaft 20 can be determined by the following factors: internal angles of the wedge-shaped opposite ends that are formed between the associated contact surface 12a and the inner peripheral surface 21, the spring force of the compression coil spring 14, the surface friction of the orthogonal end surface 1b of the boss 1a (i.e., the friction between the orthogonal end surface 1b and each steel ball 23), and the like.

Figure 4:
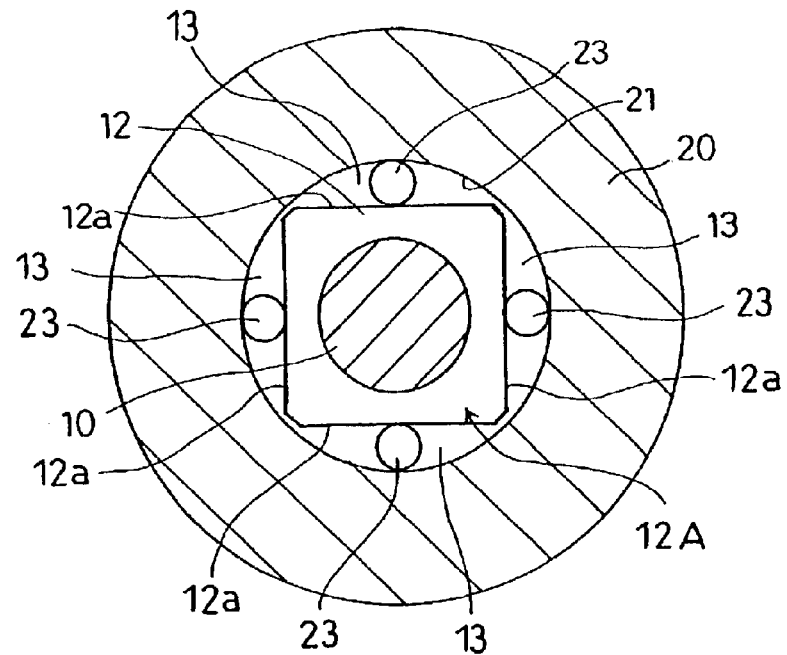
FIG. 4 is a cross sectional view of a second embodiment of the fundamental portion of the one-way rotational transfer mechanism shown in FIG. 1.
Figure 5:
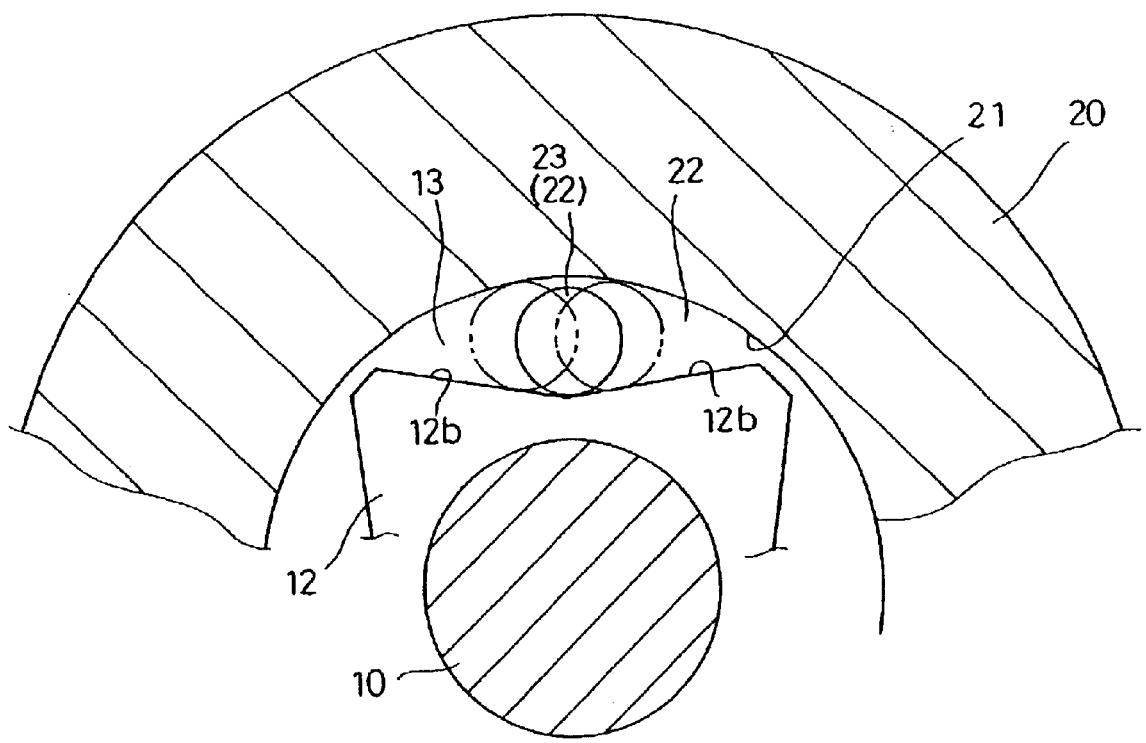
FIG. 5 is a cross sectional view of a third embodiment of the fundamental portion of the one-way rotational transfer mechanism shown in FIG. 1.

If it is desired to change the number of the accommodation spaces 22 (the number of the steel balls 23), a polygonal prism portion other than a triangular prism portion such as the triangular prism portion 12 only needs to be formed on the rotary input shaft 10. FIG. 4 shows another embodiment (second embodiment) of the circumferentially-uneven-width-space forming portion. This embodiment of the circumferentially-uneven-width-space forming portion is formed as a substantially quadratic (rectangular) prism portion 12A having an even thickness in the axial direction of the rotary input shaft 10. The outer peripheral surface of the quadratic prism portion 12A is provided with four contact surfaces 12a arranged at regular intervals of 90 degrees about the axis of the rotary input shaft 10. Theoretically, the number of the accommodation spaces 22 (the number of the steel balls 23) can be one if balance does not have to be achieved (if balance can be achieved). Although each contact surface 12a is even and extends orthogonal to a radial direction of the rotary input shaft 10 in each of the embodiments shown in FIGS. 3 and 4, each contact surface 12a can be modified as an uneven surface as shown in another embodiment (third embodiment) of the circumferentially-uneven-width-space forming portion shown in FIG. 5. In this embodiment, each contact surface that is in contact with the associated steel ball 23 is formed as a pair of inclined surfaces 12b which are symmetrical with respect to a line extending in a radial direction of the rotary input shaft 10. According to this embodiment shown in FIG. 5, the internal angles of the aforementioned wedge-shaped opposite ends can be easily determined and adjusted. If the pair of inclined surfaces 12b are formed asymmetrical with respect to a line extending in a radial direction of the rotary input shaft 10, the torque which is transferred from the rotary input shaft 10 to the hollow-cylindrical rotary output shaft 20 when the rotary input shaft 10 is driven to rotate in a forward rotational direction can be set different from that when the rotary input shaft 10 is driven to rotate in a reverse rotational direction.

Figure 6:
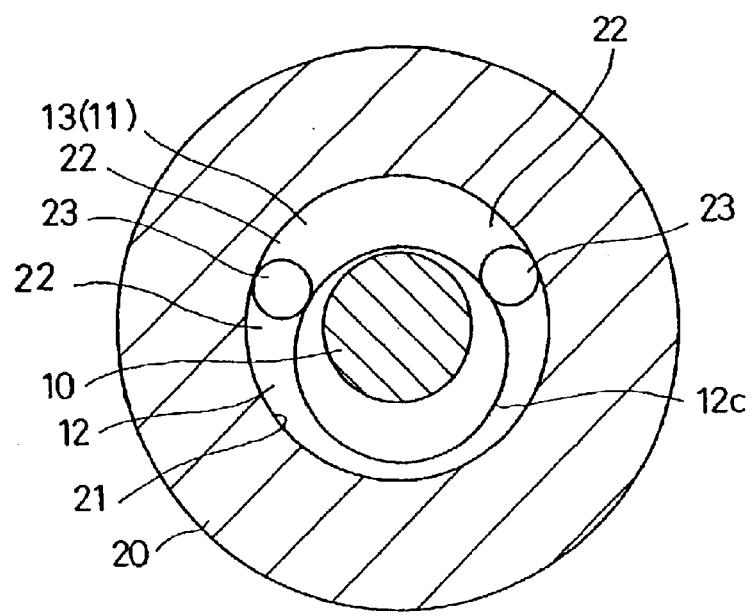
FIG. 6 is a cross sectional view of a fourth embodiment of the fundamental portion of the one-way rotational transfer mechanism shown in FIG. 1.

An eccentric cylindrical surface eccentric from the axis of the rotary input shaft 10 can serve as the circumferentially-uneven-width-space forming portion. FIG. 6 shows another embodiment (fourth embodiment) of the circumferentially-uneven-width-space forming portion. This embodiment of the circumferentially-uneven-width-space forming portion is formed as an eccentric cylindrical surface 12c which is eccentric from the axis of the rotary input shaft 10. In this embodiment, two steel balls 23 are installed in a single accommodation space 22 which is formed symmetrical to a line extending in a radial direction of the rotary input shaft 10. This embodiment is effective on condition that the two steel balls 23 stably remain in the opposite ends of the accommodation space 22, respectively, i.e., so long as both the two steel balls 23 do not move to either one of the opposite ends of the accommodation space 22.

In each embodiment described above, the problem of the frictional resistances between the compression coil spring 14 and the outer flange 11 and between the compression coil spring 14 and the boss 2a is not taken into account for the purpose of simplifying the descriptions of the present invention. One solution to reduce such frictional resistances is to install a low-frictional washer in between the compression coil spring 14 and the outer flange 11 and/or between the compression coil spring 14 and the boss 2a. Although formed on the outer flange 11, the orthogonal surface 13 can be formed on a surface of any other member.

Figure 7:
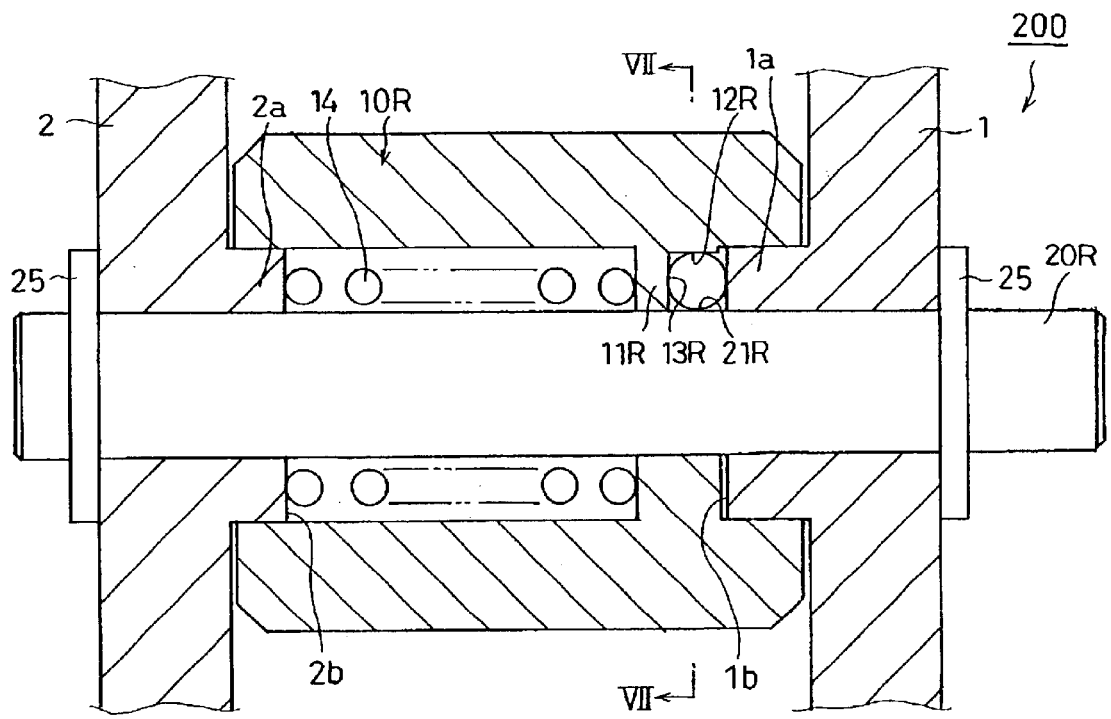
FIG. 7 is a longitudinal cross sectional view of a second embodiment of the one-way rotational transfer mechanism according to the present invention.
Figure 8:
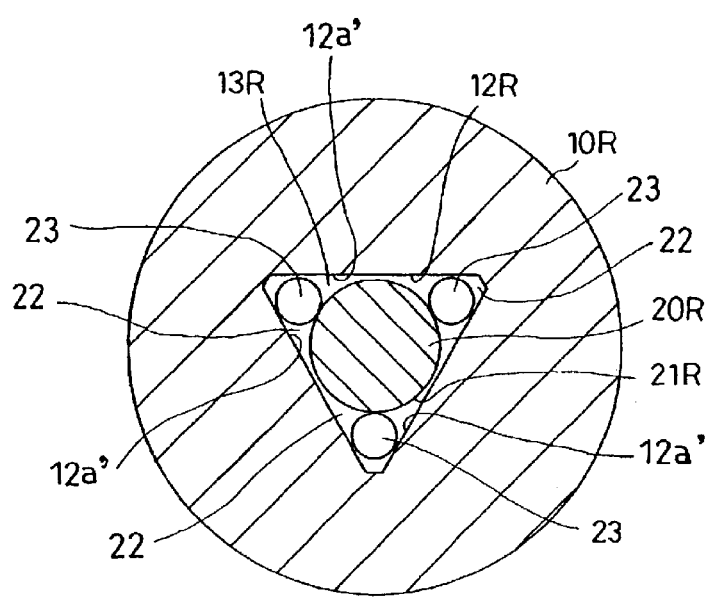
FIG. 8 is a cross sectional view taken along VIII—VIII line shown in FIG. 1, showing an embodiment of a fundamental portion of the one-way rotational transfer mechanism shown in FIG. 7.
Figure 9:
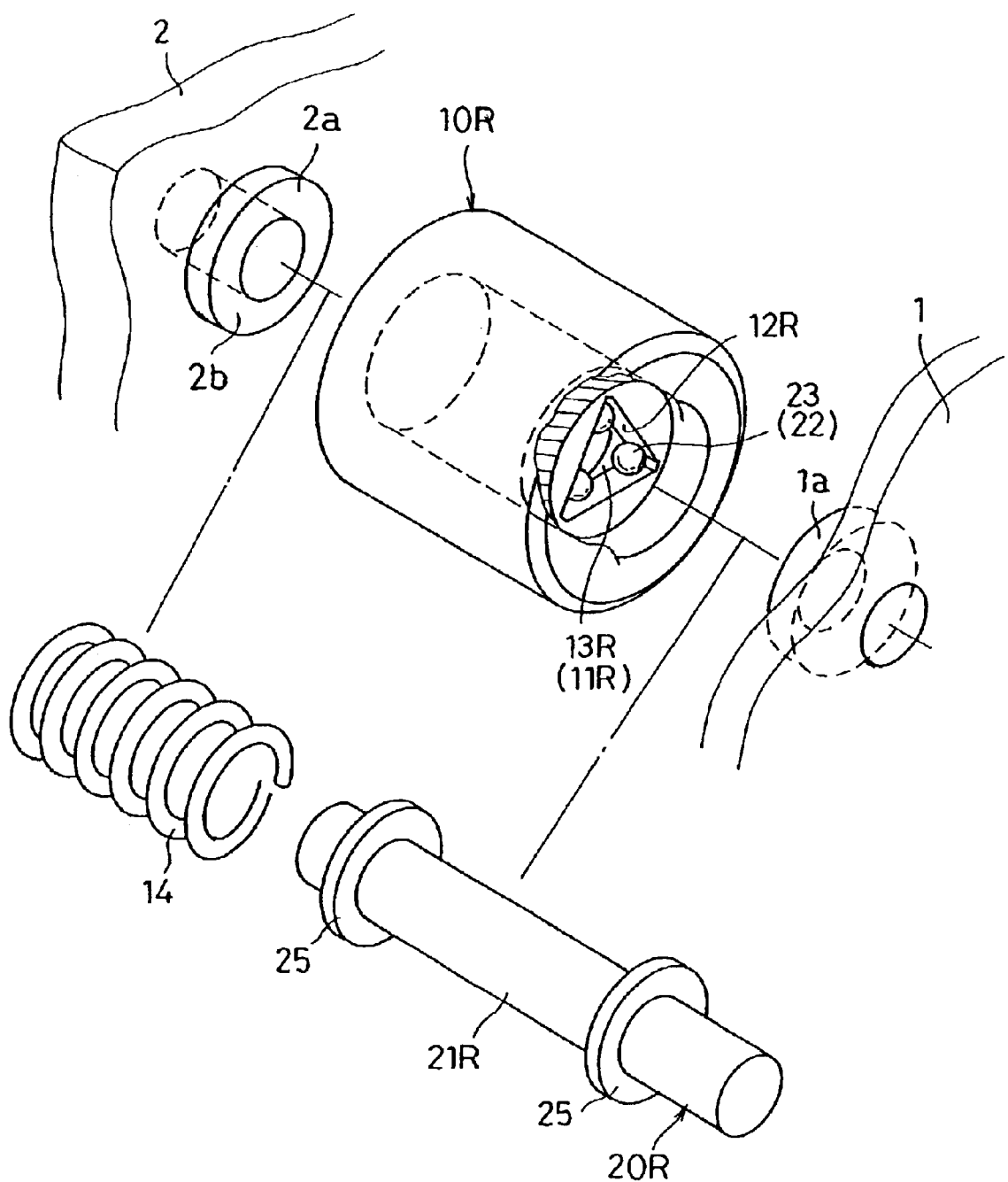
FIG. 9 is an exploded perspective view, partly cutaway, of the one-way rotational transfer mechanism shown in FIG. 8.

FIGS. 7 through 9 show the second embodiment of the one-way rotational transfer mechanism according to the present invention. In this embodiment elements and parts similar to those in the first embodiment of the one-way rotational transfer are designated by the same reference numerals. Although the rotary output shaft is positioned around the rotary input shaft in the first embodiment of the one-way rotational transfer mechanism, the rotary input shaft is positioned around the rotary output shaft in the second embodiment of the one-way rotational transfer mechanism. Namely, the one-way rotational transfer mechanism 200 is provided with a rotary output shaft 20R which is fitted in respective central holes of the bosses 1a and 2a so that the rotary output shaft 20R is freely rotatable about the axis of the bosses 1a and 2a, while the one-way rotational transfer mechanism 200 is provided, on outer peripheral surfaces of the bosses 1a and 2a between the first and the second bearing plates 1 and 2, with a hollow-cylindrical rotary input shaft 10R which is freely rotatable about the axis of the rotary output shaft 20R. The hollow-cylindrical rotary input shaft 10R is provided on an inner peripheral surface thereof with an inner flange 11R, and is further provided, on one side (right side as viewed in FIG. 7) of the inner flange 11R inside the hollow-cylindrical rotary input shaft 10R, with a triangular-prism-shaped space 12R serving as a circumferentially-uneven-width-space forming portion (portion having a non-circular cross section). The inner flange 11R is provided on one side (right side as viewed in FIG. 7) thereof adjacent to the triangular-prism-shaped space 12R with an orthogonal surface (first orthogonal surface) 13R which lies in a plane orthogonal to the axis of the rotary output shaft 20R. The triangular-prism-shaped space 12R is surrounded and formed by a portion of the inner peripheral surface of the hollow-cylindrical rotary input shaft 10R. A space between the orthogonal surface 13R of the inner flange 11R and the orthogonal end surface 1b (second orthogonal surface) of the boss 1a around an outer peripheral surface 21R of the rotary output shaft 20R is surrounded by a portion of the inner peripheral surface of the hollow-cylindrical rotary input shaft 10R to form three accommodation spaces 22 (see FIG. 8), respectively. The rotary output shaft 20R is provided thereon with two outer stop flanges 25 which are respectively in contact with outer surfaces of the first and second bearing plates 1 and 2 to prevent the rotary output shaft 20R from coming out of the first and second bearing plates 1 and 2. An inner peripheral surface of the hollow-cylindrical rotary input shaft 10R which forms the triangular-prism-shaped space 12R has three contact surfaces 12a' arranged at regular intervals of 120 degrees about the axis of the rotary output shaft 20R. Each contact surface 12a' is a flat surface, and extends orthogonal to a radial direction of the hollow-cylindrical rotary input shaft 10R.

The three steel balls 23 are installed in the three accommodation spaces 22, respectively. The compression coil spring 14 biases the inner flange 11R along the axis of the rotary output shaft 20R in a direction to move the orthogonal surface 13R of the inner flange 11R toward the orthogonal end surface 1b of the boss 1a so that the three steel balls 23 are held tight between the orthogonal surface 13R and the orthogonal end surface 1b.

According to the second embodiment of the one-way rotational transfer mechanism shown in FIGS. 7 through 9, an effect similar to the effect obtained in the first embodiment of the one-way rotational transfer mechanism is obtained. Namely, when the hollow-cylindrical rotary input shaft 10R is driven to rotate, each steel ball 23 rotates by rotation of the orthogonal surface 13R to move in a direction to get into one of wedge-shaped opposite ends which are formed in the associated accommodation space 22. Consequently, the rotation of the hollow-cylindrical rotary input shaft 10R is transferred to the rotary output shaft 20R. However, when the rotary output shaft 20R is rotated, each steel ball 23 merely rotates in the associated accommodation space 22 by the rotation of the outer peripheral surface 21R of the rotary output shaft 20R, so that the rotation of the rotary output shaft 20R is not transferred to the hollow-cylindrical rotary input shaft 10R.

Figure 10:
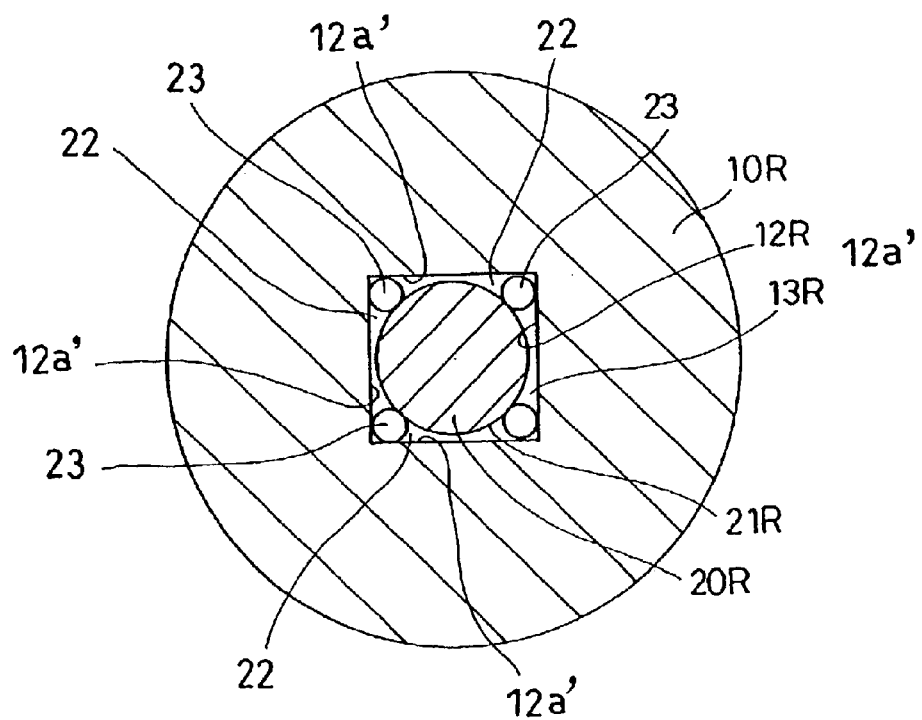
FIG. 10 is a cross sectional view of a second embodiment of a fundamental portion of the one-way rotational transfer mechanism shown in FIG. 7.

FIG. 10 shows another embodiment (second embodiment) of a fundamental portion of the second embodiment of the one-way rotational transfer mechanism. This embodiment is provided with a square-prism-shaped space 12R serving as the circumferentially-uneven-width-space forming portion (portion having a non-circular cross section) instead of the triangular-prism-shaped space 12R shown in FIGS. 7 through 9. Four steel balls 23 are installed in the four accommodation spaces 22, respectively. According to the embodiment shown in FIG. 10, the internal angle of each of the wedge-shaped opposite ends that are formed in each accommodation space 22 becomes greater than that in the embodiment shown in FIG. 7. Accordingly, the embodiment shown in FIG. 10 is effectively used, especially when the torque which is transferred from the hollow-cylindrical rotary input shaft 10R to the rotary output shaft 20R is small. Nevertheless, the maximum transferable torque can be increased by using smaller steel balls, which makes it possible to increase the internal angles of the wedge-shaped opposite ends. The embodiment shown in FIG. 10 can be modified to be provided with an eccentric cylindrical surface corresponding to the eccentric cylindrical surface 12c shown in FIG. 6.

Figure 11:
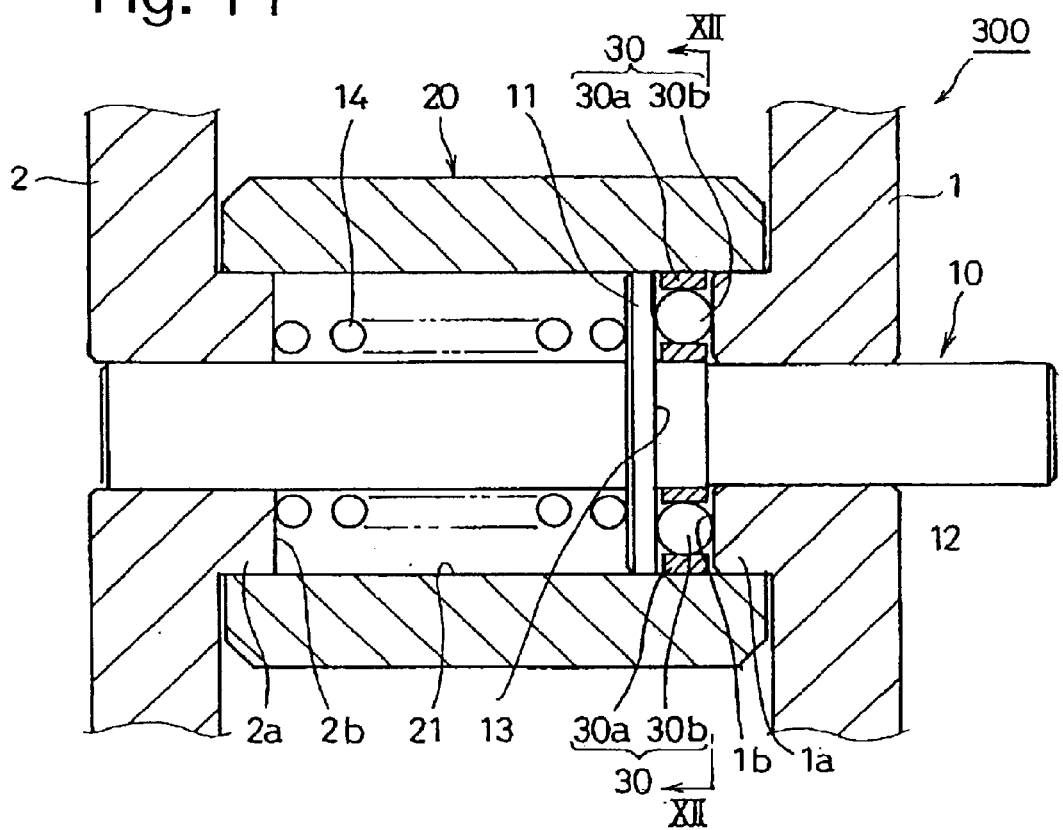
FIG. 11 is a longitudinal cross sectional view of a third embodiment of the one-way rotational transfer mechanism according to the present invention which uses ball-incorporated hollow-cylindrical rollers instead of simple steel balls.
Figure 12:
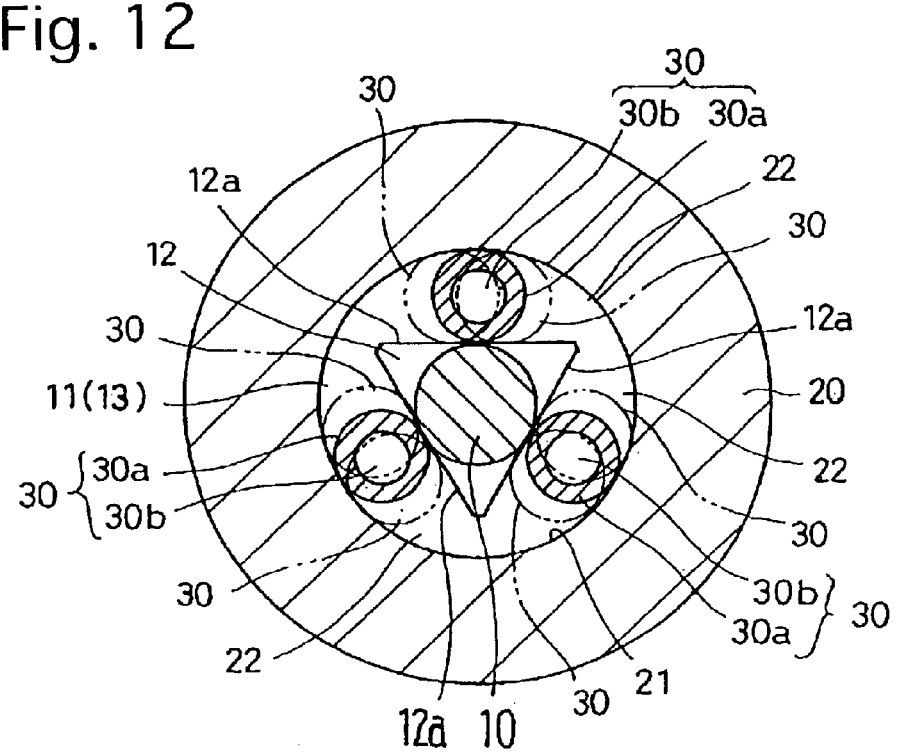
FIG. 12 is a cross sectional view taken along XII—XII line shown in FIG. 11.
Figure 13:
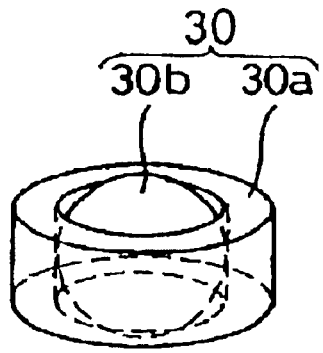
FIG. 13 is a perspective view of a ball-incorporated hollow-cylindrical roller shown in FIG. 11.

FIG. 11 shows a third embodiment of the one-way rotational transfer mechanism according to the present invention. This embodiment of the one-way rotational transfer mechanism 300 is substantially the same as the first embodiment of the one-way rotational transfer mechanism 100 except that the one-way rotational transfer mechanism 300 uses ball-incorporated hollow-cylindrical rollers 30 instead of the simple steel balls 23. As shown in FIG. 13, the ball-incorporated hollow-cylindrical rollers 30 are provided with a hollow cylindrical ring (hollow cylindrical roller) 30a and a steel ball 30b which is loosely fitted in the hollow cylindrical ring 30a. Similar to the steel balls 23 of the one-way rotational transfer mechanism 100, hardened steel balls of a conventional ball bearing can be used as the steel balls 30b. The axial lengths of the hollow cylindrical rings 30a are slightly smaller than the diameters of the steel balls 30b. As shown in FIG. 11, the three ball-incorporated hollow-cylindrical rollers 30 are respectively installed in the three accommodation spaces 22 so that the axis of each ring 30a extends substantially parallel to the respective axes of the rotary input shaft 10 and the cylindrical rotary output shaft 20 and so that each ball-incorporated hollow-cylindrical roller 30 can move on the associated contact surface 12a in the associated accommodation space 22. Accordingly, the outer peripheral surfaces of the ball-incorporated hollow-cylindrical rollers 30 can contact the contact surfaces 12a of the triangular prism portion 12 and the inner peripheral surface 21 of the rotary output shaft 20. The steel balls 30b are held tight between the orthogonal surface 13 and the orthogonal end surface 1b of the boss 1a by the spring force of the compression coil spring 14, whereas the rings 30a are not held tight between the orthogonal surface 13 and the orthogonal end surface 1b of the boss 1a because the axial lengths of the hollow cylindrical rings 30a are slightly smaller than the diameters of the steel balls 30b. According to the third embodiment of the one-way rotational transfer mechanism 300, an effect similar to the effect obtained in the first embodiment of the one-way rotational transfer mechanism is obtained. In addition, a greater torque can be transferred from the rotary input shaft 10 to the rotary output shaft 20 as compared with the one-way rotational transfer mechanism 100 because the ring 30a of each ball-incorporated hollow-cylindrical roller 30 can come into surface contact with each of the associated contact surface 12a of the triangular prism portion 12 and the inner peripheral surface 21 of the rotary output shaft 20.

The steel balls 23 can be respectively replaced by the ball-incorporated hollow-cylindrical rollers 30 in each embodiment shown in FIGS. 4 through 10 to obtain a similar effect.

Figure 14:
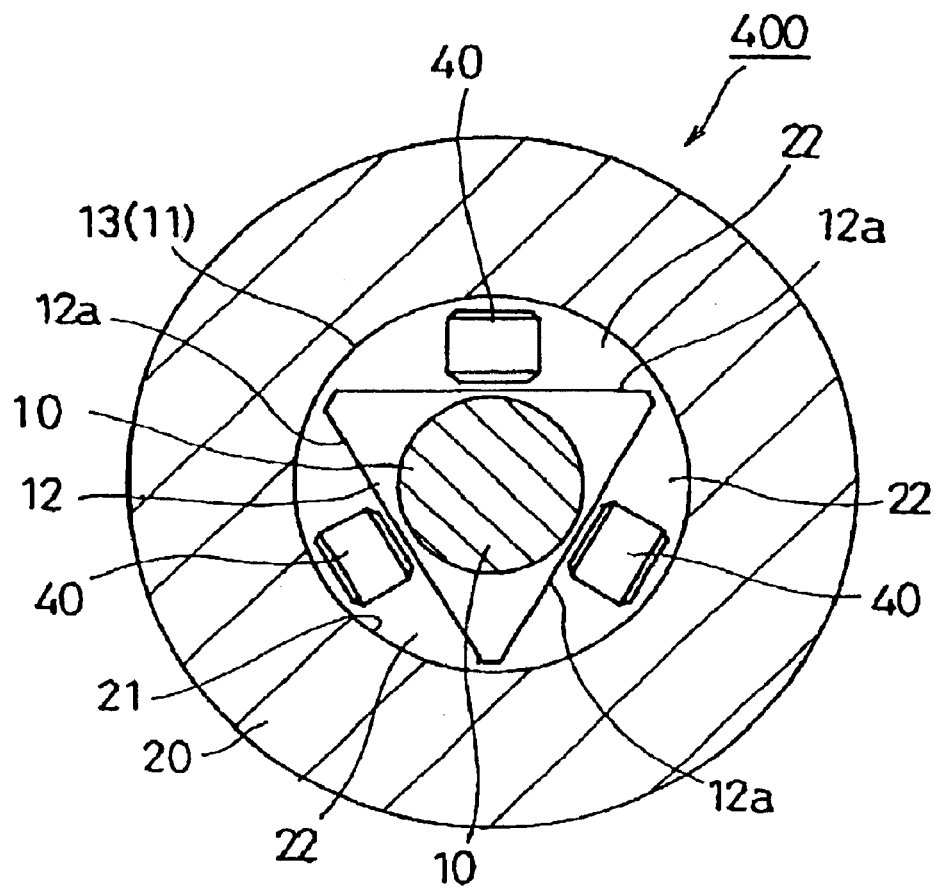
FIG. 14 is a longitudinal cross sectional view of a fourth embodiment of the one-way rotational transfer mechanism according to the present invention which uses cylindrical column rollers instead of simple steel balls.

FIG. 14 shows a fourth embodiment of the one-way rotational transfer mechanism according to the present invention. This embodiment of the one-way rotational transfer mechanism 400 is substantially the same as the first embodiment of the one-way rotational transfer mechanism 100 except that the one-way rotational transfer mechanism 400 uses cylindrical column rollers 40 instead of the simple steel balls 23. As shown in FIG. 14, the annular edge of each axial end of each cylindrical column roller 40 is beveled. The cylindrical column rollers 40 are respectively installed in the three accommodation spaces 22 so that the axis of each cylindrical column roller 40 extends in a radial direction of the rotary input shaft 10 as shown in FIG. 14 and so that each cylindrical column roller 40 can move in the associated accommodation space 22 with an outer peripheral surface of the cylindrical column roller 40 remaining in contact with the orthogonal surface 13 and the orthogonal end surface 1b of the boss 1a. The cylindrical column rollers 40 are held tight between the orthogonal surface 13 and the orthogonal end surface 1b of the boss 1a by the spring force of the compression coil spring 14. According to the fourth embodiment of the one-way rotational transfer mechanism 400, an effect similar to the effect obtained in the first embodiment of the one-way rotational transfer mechanism is obtained.

The steel balls 23 can be respectively replaced by the cylindrical column rollers 40 in each embodiment shown in FIGS. 4 through 10 to obtain a similar effect.

As can be understood from the foregoing, according to the present invention, a simple one-way rotational transfer mechanism which allows rotation of the rotary input shaft to be transferred to the rotary output shaft while preventing rotation of the rotary output shaft from being transferred to the rotary input shaft is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A one-way rotational transfer mechanism comprising:
   a rotary input shaft having an orthogonal surface lying in a plane orthogonal to an axis of said rotary input shaft;
   a hollow-cylindrical rotary output shaft positioned around said rotary input shaft to be freely rotatable relative to said rotary input shaft about said axis thereof, said hollow-cylindrical rotary output shaft having a cylindrical inner peripheral surface about said axis of said rotary input shaft;
   a circumferentially-uneven-width-space forming portion formed on said rotary input shaft to be adjacent to said orthogonal surface to form at least one accommodation space between said rotary input shaft and said cylindrical inner peripheral surface;
   at least one rotatable member installed in said accommodation space; and
   a biasing device for making said orthogonal surface and said rotatable member come into pressing contact with each other,
   wherein said circumferentially-uneven-width-space forming portion is shaped so that a rotation of said rotary input shaft is transferred to said hollow-cylindrical rotary output shaft via said rotatable member to which said rotation is given from said orthogonal surface when said rotary input shaft is driven to rotate.

2. The one-way rotational transfer mechanism according to claim 1, wherein said rotatable member comprises a ball.

3. The one-way rotational transfer mechanism according to claim 1, wherein said rotatable member comprises:
   a ball; and
   a ring in which said ball is loosely fitted, and
   wherein said ring is positioned in associated said accommodation space so that an axis of said ring extends substantially parallel to each of said axis of said rotary input shaft and an axis of said hollow-cylindrical rotary output shaft.

4. The one-way rotational transfer mechanism according to claim 3, wherein an axial length of said ring is smaller than a diameter of said ball.

5. The one-way rotational transfer mechanism according to claim 1, wherein said rotatable member comprises a cylindrical column roller which is positioned in associated said accommodation space so that an axis of said cylindrical column roller extends substantially in a radial direction of said rotary input shaft.

6. The one-way rotational transfer mechanism according to claim 1, wherein said rotary input shaft comprises an outer flange on which said orthogonal surface is formed.

7. The one-way rotational transfer mechanism according to claim 6, further comprising two parallel bearing plates, each having a boss, said rotary input shaft being fitted in respective central holes of said bosses so that said rotary input shaft is freely rotatable about an axis of said bosses,
   wherein said biasing device comprises a compression coil spring which is positioned between said outer flange and one of said bosses, and
   wherein said circumferentially-uneven-width-space forming portion is positioned between said orthogonal surface of said outer flange and an end surface of the other of said bosses, said end surface lying in a plane orthogonal to said axis of said rotary input shaft.

8. The one-way rotational transfer mechanism according to claim 1, wherein said circumferentially-uneven-width-space forming portion comprises a portion having a non-circular cross section which includes at least one surface orthogonal to a radial direction of said rotary input shaft.

9. The one-way rotational transfer mechanism according to claim 8, wherein said circumferentially-uneven-width-space forming portion having said non-circular cross section is in the shape of a polygon.

10. The one-way rotational transfer mechanism according to claim 1, wherein said circumferentially-uneven-width-space forming portion comprises at least one pair of inclined surfaces which are symmetrical with respect to a line extending in a radial direction of said rotary input shaft.

11. The one-way rotational transfer mechanism according to claim 1, wherein said circumferentially-uneven-width-space forming portion comprises an eccentric cylindrical surface which is eccentric from said axis of said rotary input shaft.

12. The one-way rotational transfer mechanism according to claim 1, further comprising two parallel bearing plates, each having a boss, said rotary input shaft being fitted in respective central holes of said bosses so that said rotary input shaft is freely rotatable about an axis of said bosses.

13. The one-way rotational transfer mechanism according to claim 12, wherein said hollow-cylindrical rotary output shaft is fitted on outer peripheral surfaces of said bosses to be freely rotatable about said axis of said rotary input shaft.

14. The one-way rotational transfer mechanism according to claim 1, wherein said circumferentially-uneven-width-space forming portion is positioned between said orthogonal surface and an end surface of one of said bosses, said end surface lying in a plane orthogonal to said axis of said rotary input shaft.

15. The one-way rotational transfer mechanism according to claim 1, wherein said biasing device comprises a compression coil spring.

16. A one-way rotational transfer mechanism comprising:
   a rotary input shaft having a first orthogonal surface lying in a plane orthogonal to an axis of said rotary input shaft;
   a hollow-cylindrical rotary output shaft positioned around said rotary input shaft to be freely rotatable relative to said rotary input shaft about said axis thereof, said hollow-cylindrical rotary output shaft having a cylindrical inner peripheral surface about said axis of said rotary input shaft;
   a second orthogonal surface formed on a boss and lying in a plane orthogonal to said axis of said rotary input shaft to face said first orthogonal surface;

a circumferentially-uneven-width-space forming portion formed on said rotary input shaft between said first orthogonal surface and said second orthogonal surface to form at least one accommodation space between said rotary input shaft and said cylindrical inner peripheral surface;

at least one rotatable member installed in said accommodation space; and a biasing device which biases one of said rotary input shaft and said hollow-cylindrical rotary output shaft in a direction along said axis of said rotary input shaft to reduce a space between said first orthogonal surface and said second orthogonal surface so that said rotatable member is held tight between said first orthogonal surface and said second orthogonal surface, wherein said circumferentially-uneven-width-space forming portion is shaped so that a rotation of said rotary input shaft is transferred to said hollow-cylindrical rotary output shaft via said rotatable member to which said rotation is given from said first orthogonal surface when said rotary input shaft is driven to rotate.

17. The one-way rotational transfer mechanism according to claim 16, wherein said rotatable member comprises a ball.

18. The one-way rotational transfer mechanism according to claim 16, wherein said rotatable member comprises:
a ball; and
a ring in which said ball is loosely fitted, and
wherein said ring is positioned in associated said accommodation space so that an axis of said ring extends substantially parallel to each of said axis of said rotary input shaft and an axis of said hollow-cylindrical rotary output shaft.

19. The one-way rotational transfer mechanism according to claim 18, wherein an axial length of said ring is smaller than a diameter of said ball.

20. The one-way rotational transfer mechanism according to claim 16, wherein said rotatable member comprises a cylindrical column roller which is positioned in associated said accommodation space so that an axis of said cylindrical column roller extends substantially in a radial direction of said rotary input shaft.

21. The one-way rotational transfer mechanism according to claim 16, wherein said rotary input shaft comprises an outer flange on which said orthogonal surface is formed.

22. The one-way rotational transfer mechanism according to claim 21, further comprising two parallel bearing plates, each having a boss, said rotary input shaft being fitted in respective central holes of said bosses so that said rotary input shaft is freely rotatable about an axis of said bosses,
wherein said biasing device comprises a compression coil spring which is positioned between said outer flange and one of said bosses, and
wherein said circumferentially-uneven-width-space forming portion is positioned between said orthogonal surface of said outer flange and an end surface of the other of said bosses, said end surface lying in a plane orthogonal to said axis of said rotary input shaft.

23. The one-way rotational transfer mechanism according to claim 16, wherein said circumferentially-uneven-width-space forming portion comprises a portion having a non-circular cross section which includes at least one surface orthogonal to a radial direction of said rotary input shaft.

24. The one-way rotational transfer mechanism according to claim 23, wherein said circumferentially-uneven-width-space forming portion having said non-circular cross section is in the shape of a polygon.

25. The one-way rotational transfer mechanism according to claim 16, wherein said circumferentially-uneven-width-space forming portion comprises at least one pair of inclined surfaces which are symmetrical with respect to a line extending in a radial direction of said rotary input shaft.

26. The one-way rotational transfer mechanism according to claim 16, wherein said circumferentially-uneven-width-space forming portion comprises an eccentric cylindrical surface which is eccentric from said axis of said rotary input shaft.

27. The one-way rotational transfer mechanism according to claim 16, further comprising two parallel bearing plates, each having a boss, said rotary input shaft being fitted in respective central holes of said bosses so that said rotary input shaft is freely rotatable about an axis of said bosses.

28. The one-way rotational transfer mechanism according to claim 27, wherein said hollow-cylindrical rotary output shaft is fitted on outer peripheral surfaces of said bosses to be freely rotatable about said axis of said rotary input shaft.

29. The one-way rotational transfer mechanism according to claim 16, wherein said circumferentially-uneven-width-space forming portion is positioned between said orthogonal surface and an end surface of one of said bosses, said end surface lying in a plane orthogonal to said axis of said rotary input shaft.

30. The one-way rotational transfer mechanism according to claim 16, wherein said biasing device comprises a compression coil spring.

31. A one-way rotational transfer mechanism comprising:
a rotary output shaft;
a hollow-cylindrical rotary input shaft positioned around said rotary output shaft to be freely rotatable relative to said rotary output shaft about an axis thereof, said hollow-cylindrical rotary input shaft having an orthogonal surface lying in a plane orthogonal to an axis of said hollow-cylindrical rotary input shaft;
a circumferentially-uneven-width-space forming portion formed on said hollow-cylindrical rotary input shaft to be adjacent to said orthogonal surface to form at least one accommodation space between said rotary output shaft and an inner peripheral surface of said hollow-cylindrical rotary input shaft;
at least one rotatable member installed in said accommodation space; and
a biasing device for making said orthogonal surface and said rotatable member come into pressing contact with each other,
wherein said circumferentially-uneven-width-space forming portion is shaped so that a rotation of said hollow-cylindrical rotary input shaft is transferred to said rotary output shaft via said rotatable member to which said rotation is given from said orthogonal surface when said hollow-cylindrical rotary input shaft is driven to rotate.

32. The one-way rotational transfer mechanism according to claim 31, wherein said rotatable member comprises a ball.

33. The one-way rotational transfer mechanism according to claim 31, wherein each said rotatable member comprises:
a ball; and
a ring in which said ball is loosely fitted, and
wherein said ring is positioned in associated said accommodation space so that an axis of said ring extends substantially parallel to each of said axis of said hollow-cylindrical rotary input shaft and an axis of said rotary output shaft.

34. The one-way rotational transfer mechanism according to claim 33, wherein an axial length of said ring is smaller than a diameter of said ball.

35. The one-way rotational transfer mechanism according to claim 31, wherein said rotatable member comprises a cylindrical column roller which is positioned in associated said accommodation space so that an axis of said cylindrical column roller extends substantially in a radial direction of said rotary output shaft.

36. The one-way rotational transfer mechanism according to claim 31, wherein said hollow-cylindrical rotary input shaft comprises an inner flange on which said orthogonal surface is formed.

37. The one-way rotational transfer mechanism according to claim 36, further comprising two parallel bearing plates, each having a boss, said rotary output shaft being fitted in respective central holes of said bosses so that said rotary output shaft is freely rotatable about an axis of said bosses,
wherein said biasing device comprises a compression coil spring which is positioned between said inner flange and one of said bosses, and
wherein said circumferentially-uneven-width-space forming portion is positioned between said orthogonal surface of said inner flange and an end surface of the other of said bosses, said end surface lying in a plane orthogonal to said axis of said rotary output shaft.

38. The one-way rotational transfer mechanism according to claim 31, wherein said circumferentially-uneven-width-space forming portion comprises a portion having a non-circular cross section which includes at least one surface orthogonal to a radial direction of said rotary output shaft.

39. The one-way rotational transfer mechanism according to claim 38, wherein said portion having said non-circular cross section is in the shape of a polygon.

40. The one-way rotational transfer mechanism according to claim 31, wherein said circumferentially-uneven-width-space forming portion comprises at least one pair of inclined surfaces symmetrical with respect to a line extending in a radial direction of said rotary output shaft.

41. The one-way rotational transfer mechanism according to claim 31, wherein said circumferentially-uneven-width-space forming portion comprises an eccentric cylindrical surface which is eccentric from said axis of said rotary output shaft.

42. The one-way rotational transfer mechanism according to claim 31, further comprising two parallel bearing plates, each having a boss, said rotary output shaft being fitted in respective central holes of said bosses so that said rotary output shaft is freely rotatable about an axis of said two bosses.

43. The one-way rotational transfer mechanism according to claim 42, wherein said hollow-cylindrical rotary input shaft is fitted on outer peripheral surfaces of said bosses to be freely rotatable about said axis of said rotary output shaft.

44. The one-way rotational transfer mechanism according to claim 31, wherein said circumferentially-uneven-width-space forming portion is positioned between said orthogonal surface and an end surface of one of said bosses, said end surface lying in a plane orthogonal to said axis of said rotary output shaft.

45. The one-way rotational transfer mechanism according to claim 31, said biasing device comprises a compression coil spring.

46. A one-way rotational transfer mechanism comprising:
a rotary output shaft;
a hollow-cylindrical rotary input shaft positioned around said rotary output shaft to be freely rotatable relative to said rotary output shaft about an axis thereof, said hollow-cylindrical rotary input shaft having a first orthogonal surface lying in a plane orthogonal to an axis of said hollow-cylindrical rotary input shaft;
a second orthogonal surface formed on a boss to lie in a plane orthogonal to said axis of said rotary output shaft and to face said first orthogonal surface;
a circumferentially-uneven-width-space forming portion formed on said hollow-cylindrical rotary input shaft between said first orthogonal surface and said second orthogonal surface to form at least one accommodation space between said rotary output shaft and an inner peripheral surface of said hollow-cylindrical rotary input shaft;
at least one rotatable member installed in said accommodation space; and
a biasing device which biases one of said rotary output shaft and said hollow-cylindrical rotary input shaft in a direction along said axis of said rotary output shaft to reduce a space between said first orthogonal surface and said second orthogonal surface so that said rotatable member are held tight between said first orthogonal surface and said second orthogonal surface,
wherein said circumferentially-uneven-width-space forming portion is shaped so that a rotation of said hollow-cylindrical rotary input shaft is transferred to said rotary output shaft via said rotatable member to which said rotation is given from said first orthogonal surface when said hollow-cylindrical rotary input shaft is driven to rotate.

47. The one-way rotational transfer mechanism according to claim 46, wherein said rotatable member comprises a ball.

48. The one-way rotational transfer mechanism according to claim 46, wherein each said rotatable member comprises:
a ball; and
a ring in which said ball is loosely fitted, and
wherein said ring is positioned in associated said accommodation space so that an axis of said ring extends substantially parallel to each of said axis of said hollow-cylindrical rotary input shaft and an axis of said rotary output shaft.

49. The one-way rotational transfer mechanism according to claim 48, wherein an axial length of said ring is smaller than a diameter of said ball.

50. The one-way rotational transfer mechanism according to claim 46, wherein said rotatable member comprises a cylindrical column roller which is positioned in associated said accommodation space so that an axis of said cylindrical column roller extends substantially in a radial direction of said rotary output shaft.

51. The one-way rotational transfer mechanism according to claim 46, wherein said hollow-cylindrical rotary input shaft comprises an inner flange on which said orthogonal surface is formed.

52. The one-way rotational transfer mechanism according to claim 51, further comprising two parallel bearing plates, each having a boss, said rotary output shaft being fitted in respective central holes of said bosses so that said rotary output shaft is freely rotatable about an axis of said bosses,
wherein said biasing device comprises a compression coil spring which is positioned between said inner flange and one of said bosses, and
wherein said circumferentially-uneven-width-space forming portion is positioned between said orthogonal surface of said inner flange and an end surface of the other of said bosses, said end surface lying in a plane orthogonal to said axis of said rotary output shaft.

53. The one-way rotational transfer mechanism according to claim 46, wherein said circumferentially-uneven-width-space forming portion comprises a portion having a non-circular cross section which includes at least one surface orthogonal to a radial direction of said rotary output shaft.

54. The one-way rotational transfer mechanism according to claim 53, wherein said portion having said non-circular cross section is in the shape of a polygon.

55. The one-way rotational transfer mechanism according to claim 46, wherein said circumferentially-uneven-width-space forming portion comprises at least one pair of inclined surfaces symmetrical with respect to a line extending in a radial direction of said rotary output shaft.

56. The one-way rotational transfer mechanism according to claim 46, wherein said circumferentially-uneven-width-space forming portion comprises an eccentric cylindrical surface which is eccentric from said axis of said rotary output shaft.

57. The one-way rotational transfer mechanism according to claim 46, further comprising two parallel bearing plates, each having a boss, said rotary output shaft being fitted in respective central holes of said bosses so that said rotary output shaft is freely rotatable about an axis of said two bosses.

58. The one-way rotational transfer mechanism according to claim 57, wherein said hollow-cylindrical rotary input shaft is fitted on outer peripheral surfaces of said bosses to be freely rotatable about said axis of said rotary output shaft.

59. The one-way rotational transfer mechanism according to claim 46, wherein said circumferentially-uneven-width-space forming portion is positioned between said orthogonal surface and an end surface of one of said bosses, said end surface lying in a plane orthogonal to said axis of said rotary output shaft.

60. The one-way rotational transfer mechanism according to claim 46, said biasing device comprises a compression coil spring.

* * * * *